United States Patent [19]

Frishman

[11] 4,097,015
[45] Jun. 27, 1978

[54] CEILING HOOK

[76] Inventor: Daniel Frishman, Andover, Mass.

[21] Appl. No.: 721,158

[22] Filed: Sep. 7, 1976

[51] Int. Cl.[2] ............................................. B42F 13/00
[52] U.S. Cl. .............................. 248/339; 24/230.5 AD
[58] Field of Search .............. 248/304, 339, 499, 305, 248/308, 225.2; 24/230.5 AD, 230.5 SS, 230.5 T, 230.5 R

[56] References Cited

U.S. PATENT DOCUMENTS

| 427,642 | 5/1890 | Wack | 24/230.5 T |
|---|---|---|---|
| 645,057 | 3/1900 | Ayers et al. | 248/339 X |
| 812,691 | 2/1906 | Smith | 248/339 |
| 815,019 | 3/1906 | Kampfe | 248/339 |
| 850,623 | 4/1907 | Clark | 24/230.5 T |
| 860,762 | 7/1907 | McGrady | 248/339 |
| 1,247,500 | 11/1917 | Bulmer | 248/339 |
| 3,055,625 | 9/1962 | Kopf et al. | 248/339 |
| 3,297,293 | 1/1967 | Andrews et al. | 248/499 |
| 3,977,643 | 8/1976 | Staley | 248/339 |
| 3,995,822 | 12/1976 | Einhorn | 24/230.5 AD |

Primary Examiner—J. Franklin Foss
Attorney, Agent, or Firm—Wolf, Greenfield & Sacks

[57] ABSTRACT

A rotatable ceiling hook for plants and the like. The hook is shaped in the form of a helix which is secured to a support at a point midway between its ends by a suitable means such as a screw to provide a strong and balanced ceiling hook. Interposed between the screw and the helix is a base and a washer separated by a rigid cylindrical spacer. The helix rotates around the spacer, thus providing easy rotation even when the screw is firmly attached to a support and the hook is heavily loaded.

2 Claims, 4 Drawing Figures

U.S. Patent   June 27, 1978   4,097,015
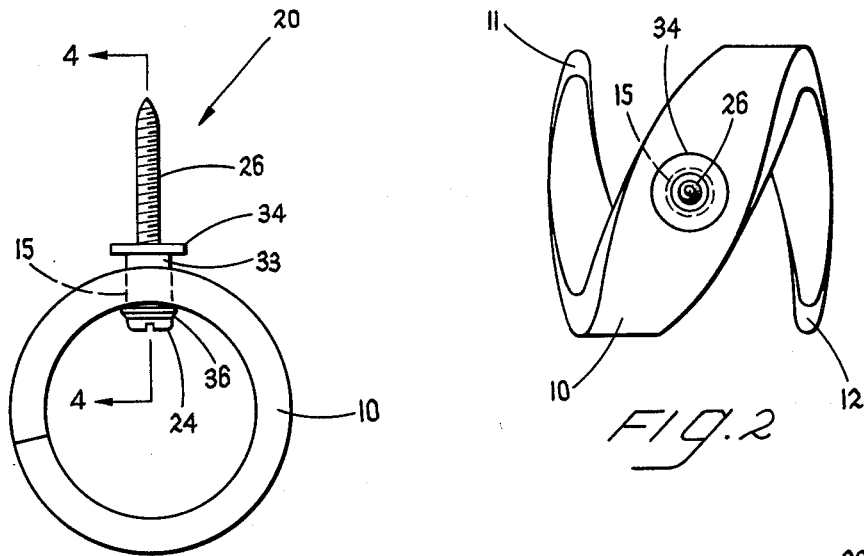
FIG.1
FIG.2
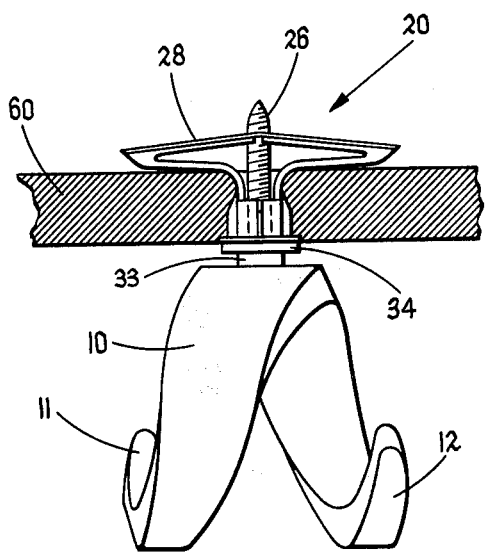
FIG.3
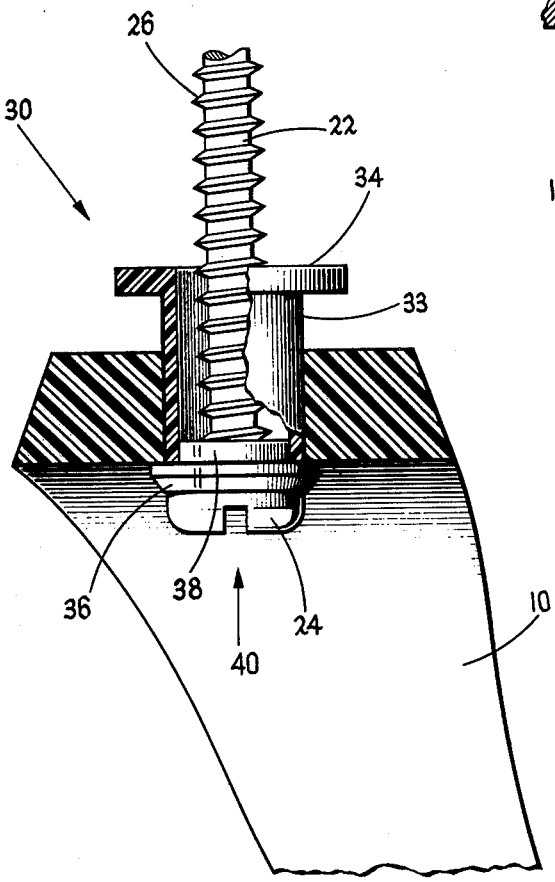
FIG.4

CEILING HOOK

BACKGROUND OF THE INVENTION

The invention relates to a ceiling hook that rotates easily even when bearing heavy loads, and that can be manufactured easily with a minimum of waste.

Ceiling hooks are useful for a variety of purposes, including but not limited to the hanging of lamps and plants. A rotatable hook is particularly useful for plants because indoors light normally falls upon the plant from predominately a single direction and, therefore, in order to obtain the balanced plant growth that is most healthy for the plant and most pleasing to the eye, it is necessary to regularly rotate the plant. It is desirable that such rotation be performed smoothly and with a minimum of manipulation. Since the larger and heavier the plant, the less maneuverable it is, it is highly desirable that the mechanism by which the plant is rotated perform smoothly even when heavy loads are supported by it.

Ceiling hooks must not bend significantly or break even when supporting a load. Therefore ceiling hooks are usually made of metal with little concern for aesthetics. However, plants and lamps usually have a decorative function, and thus it is highly desirable that the hook which supports them be attractive.

Accordingly, it is an object of this invention to provide an attractive ceiling hook that is durable and strong and that rotates easily and smoothly even when heavily loaded.

It is another object of this invention to provide a ceiling hook that achieves the preceding object and, at the same time, is easily manufactured with a minimum of waste.

SUMMARY OF THE INVENTION

The present invention provides a helical segment (helix) spiralling through more than 360 degrees, with means for securing the helical segment to a support with its axis substantially horizontal, so that loops extending on either side of the support are disposed to retain an object hung from them. The ceiling hook is attached to the support at a point located midway between the ends of the helical segment, so that the ends of the segment form two symmetrical hooks extending out on either side of the point of attachment. The helical segment is also mounted on a swivel means so that it may rotate.

Preferably the means for securing comprises a hollow, cylindrical spacer adapted to fit loosely in and extend through a hole in the helical segment. A screw extends through the spacer along its cylindrical axis. Preferably a washer on which the helix rotates fits between the head of the screw and one end of the cylindrical spacer. The other end of the cylindrical spacer has an integrally formed base perpendicular to the cylindrical axis. The cylindrical spacer is longer than the thickness of the helix, so that a screw passing through the spacer and into a support may press the spacer firmly up against the support while still allowing the helix to rotate freely on the spacer. Preferably the helix is formed of a clear material such as acrylic plastic or polystyrene. A variety of other materials, including metal, in some modifications of the invention, may be used.

Numerous other features, objects and advantages of the invention will now become apparent from the following detailed description when read in conjunction with the accompanying drawing, in which:

BRIEF DESCRIPTION OF THE DRAWING

FIG. 1 is a side view of the preferred embodiment of the invention, adapted to be screwed into a solid object;

FIG. 2 is the same embodiment of the invention as shown in FIG. 1, viewed from the top;

FIG. 3 is a view of the embodiment of the invention incorporating a toggle bolt secured to a ceiling and rotated ninety degrees from the view in FIG. 1;

FIG. 4 is a cross-section view of the invention taken through a line 4—4 of FIG. 1.

DETAILED DESCRIPTION OF THE PREFERRED EMBODIMENT

Referring to the drawing, and, more particularly, to FIGS. 2 and 3 thereof, there are shown top and side views of the invention. Helical segment 10 is mounted on a swivel means, shown generally at 30, which permits it to rotate easily, even when a relatively heavy load is supported on hooks 11 and 12.

Helical segment (helix) 10 has a cylindrical hole 15 passing through it substantially perpendicular to the axis of the helix and at a point located midway between its ends 11 and 12. Means for securing or supporting helix 10 are shown generally at 20. These means include an axle means shown generally at 40, which in the preferred embodiment is a screw. Screw 40 fits through hole 15 and supports helix 10 with its axis substantially horizontal so that ends 11 and 12 will retain an object hung from them.

Screw 40 comprises a shaft 22 passing through and fitting loosely within hole 15. On one end of the shaft is a head 24, for supporting helix 10, and on the other end are screw threads 26 for attaching to a support. In one embodiment, threads 26 screw into any suitable solid material or expansion sleeve. In another embodiment, (FIG. 3), the assembly includes screw 26 which engages a toggler bolt 28 of conventional design embedded in ceiling 60.

Swivel means 30 includes a hollow cylindrical spacer 33 which fits loosely in hole 15 and about shaft 22, and a washer 36 which also fits loosely about shaft 22 between head 24 and one end of spacer 33. Washer 36 has an outer diameter larger in circumference than hole 15 so that it cannot pass through the hole, and an inner diameter smaller than the hole 15, and is adapted to seat against the end of spacer 33. In the embodiment shown, washer 36 has a cylindrical extension 38 which fits into the hollow interior of spacer 33. Base 34 is formed on the end of spacer 33 opposite washer 36 and head 24. The length of spacer 33 is longer than the thickness of helix 10 so that when screw 26 is tightened, for example into toggle bolt 28, until base 34 is pressed up against the support such as ceiling 60, and washer 36 is firmly seated in spacer 33, there remains a gap between base 34 and washer 36 equal to the length of spacer 33 and thus helix 10 may freely rotate in this gap.

In the preferred embodiment, helix 10 is composed of an acrylic plastic, but may be composed of any material of suitable strength such as other plastics, metals, wood, etc. The helix may be formed in a number of ways, such as cutting sections from flat thermoplastic stock and forming the sections into the desired helical shape while at a temperature at which the plastic may be shaped, or, alternately, the helix may be molded. The resulting hook is attractive, which is an important feature for a hook that is to be used to support plants, lamps, and other items having a decorative function.

A feature of the invention is that the helix is thickest and strongest at a point midway between the end precisely where the greatest strength is needed. The ceiling hook is also symmetrical which not only creates a pleasing appearance but also permits the load on the hook to be easily balanced which in turn contributes to smoothness and ease of rotation.

In the preferred embodiment, means for securing 20 may comprise a standard inch-and-a-half, round-headed metal screw, combined with a standard toggle bolt assembly composed of nylon. However, any other suitable means of attaching such as bolts, nails, pins, etc. may be used. In the preferred embodiment, spacer 33, base 34, and washer 36 are formed of nylon; however, other plastics, metals, etc. may be used.

Swivel 30 is a feature of the invention that provides both strength and smoothness of rotation even under heavy loads. Screw 26 may be tightened very firmly into a support; however, base 34 and washer 36, seated against spacer 33, will still define a gap equal to the length of spacer 33 in which gap helix 10 is free to rotate. Washer 36 may rotate in relation to both screwhead 24 and helix 10, that is, both its upper and lower surfaces are slippage planes. In addition, the coefficient of friction between nylon and metal, and between nylon and acrylic plastic, is relatively low. This combination of two slippage planes each having a low coefficient of friction permits easy rotation of the helix even when it is bearing relatively heavy loads. The ceiling hook, as described in the preferred embodiment, can easily support and rotate loads up to 50 lbs.

There has been described a novel, rotatable ceiling hook that is attractive, can operate with relatively heavy loads, and has numerous other features. It is evident that those skilled in the art may now make numerous uses and modifications and departures from the specific embodiments herein described without departing from the inventive concepts. For example, base 34 need not, in each embodiment, be the flange-like structure shown, but may simply be formed by the termination of spacer 33, or the base may even be attached to screw 26 and spacer 33 may be eliminated. Washer 36 may also be eliminated in some embodiments where the screw head is larger than spacer 33. Likewise, many variations of size, shape and composition of the various parts of the ceiling hook may be made. Consequently, the invention is to be construed as embracing each and every novel feature and novel combination of features present in or possessed by the apparatus herein disclosed.

What is claimed is:
1. A ceiling hook comprising
a helical segment spiralling through more than 360°, said segment tapering from a maximum width at its center, uniformly to a minimum width at each end, and having a substantially uniform thickness along its length;
and a means for pivotally securing said helical segment remote from its ends to a support with the axis of the segment substantially horizontal so that the ends of the helical segment are disposed to retain an object hung from them, said means for pivotally securing located at said center so that the ends of said segment form two hooks extending symmetrically on either side of said means for pivotally securing and said segment having a uniform thickness along its length;
said helical segment formed with a cylindrical hole passing through it substantially perpendicular to its helical axis at a point located midway between its ends, and wherein said means for securing comprises:
a hollow, cylindrical spacer, adapted to fit loosely within said hole, and having a base formed on one end perpendicular to its cylindrical axis,
an axle means comprising: a shaft fitting loosely within and extending along the axis of said cylindrical spacer; a head end adapted to rotatably support said helical segment and said cylindrical spacer, and a securing end adapted to attach to said support,
a washer having an outer diameter larger than the circumference of said hole, and fitting around said shaft and seating between said head of said axle means and the end of said cylindrical spacer opposite said base,
said cylindrical spacer having a length longer than the thickness of said helical segment so that when the securing ends of the axle means is attached to the support with said base pressed firmly against the support, the helical segment rotates freely on the cylindrical spacer.
2. A ceiling hook in accordance with claim 1, wherein said axle means comprises a screw, and said helical segment is formed of an acrylic plastic.

* * * * *